US006947978B2

(12) United States Patent
Huffman et al.

(10) Patent No.: US 6,947,978 B2
(45) Date of Patent: Sep. 20, 2005

(54) METHOD FOR GEOLOCATING LOGICAL NETWORK ADDRESSES

(75) Inventors: Stephen Mark Huffman, Sandy Spring, MD (US); Michael Henry Reifer, Columbia, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 990 days.

(21) Appl. No.: 09/752,898

(22) Filed: Dec. 29, 2000

(65) Prior Publication Data

US 2002/0087666 A1 Jul. 4, 2002

(51) Int. Cl.[7] .............................................. G06F 15/177
(52) U.S. Cl. ...................... 709/220; 709/219; 709/225; 370/455; 370/456; 455/456.1
(58) Field of Search .............................. 709/220, 219, 709/225; 370/455, 456; 455/456.1

(56) References Cited

U.S. PATENT DOCUMENTS

| | | | |
|---|---|---|---|
| 6,243,746 B1 * | 6/2001 | Sondur et al. | 709/220 |
| 6,671,514 B1 * | 12/2003 | Cedervall et al. | 455/456.1 |
| 6,684,250 B2 * | 1/2004 | Anderson et al. | 709/225 |
| 2002/0016831 A1 * | 2/2002 | Peled et al. | 709/219 |
| 2004/0203851 A1 * | 10/2004 | Vetro et al. | 455/456.1 |
| 2004/0203866 A1 * | 10/2004 | Sahinoglu et al. | 455/456.1 |

OTHER PUBLICATIONS

Beongku et al., "A Cellular Architecture For Supporting Geocast Services", VTC 2000, IEEE, pp. 1452–1459.*
Beongku et al., "A Geocast Architecture For Mobile Cellular Networks", NJ Institute Of Technology, 2000 ACM, pp. 59–67.*
Bhasker et al., "Employing User Feedback For Fast, Accurate Low–Maintenance Geolocationing", UCSD technical report #CS2003–0765, pp. 1–16.*
Cook, Peter, "A Systems Approach to Base Stations", Oct. 19, 2000, Base Station Working group, Software Defined Radio Forum Contribution, 11 pages.*

* cited by examiner

Primary Examiner—Jack B. Harvey
Assistant Examiner—Hai V. Nguyen
(74) Attorney, Agent, or Firm—Stephen M. Bloor; Robert D. Morelli

(57) ABSTRACT

Method for geolocating logical network addresses on electronically switched dynamic communications networks, such as the Internet, using the time latency of communications to and from the logical network address to determine its location. Minimum round-trip communications latency is measured between numerous stations on the network and known network addressed equipment to form a network latency topology map. Minimum round-trip communications latency is also measured between the stations and the logical network address to be geolocated. The resulting set of minimum round-trip communications latencies is then correlated with the network latency topology map to determine the location of the network address to be geolocated.

11 Claims, 3 Drawing Sheets

Latency Topology Map 130

Stations 100

| Endpoints 102 | 1 | 2 | 3 | ... | M |
|---|---|---|---|---|---|
| 1 | $T_{11}$ | $T_{21}$ | $T_{31}$ | ... | $T_{M1}$ |
| 2 | $T_{12}$ | $T_{22}$ | $T_{32}$ | ... | $T_{M2}$ |
| 3 | $T_{13}$ | $T_{23}$ | $T_{33}$ | ... | $T_{M3}$ |
| ... | ... | ... | ... | ... | ... |
| N | $T_{1N}$ | $T_{2N}$ | $T_{3N}$ | ... | $T_{MN}$ |

FIG. 3

METHOD FOR GEOLOCATING LOGICAL NETWORK ADDRESSES

FIELD OF THE INVENTION

The present invention, a Method for Geolocating Logical Network Addresses, relates to networked communications, and more particularly to a method for determining or verifying the physical location of a logical network address.

BACKGROUND OF THE INVENTION

As more of the nation's commerce and communication have moved from traditional fixed-point services to electronically switched networks the correlation between who you are communicating or doing business with and where they are physically located no longer exists. In the past, communication and commerce took place between parties at known physical locations, whether across a store counter or between post office addressees. Even telephone numbers correlated, more or less, to a permanent fixed location.

There are still many advantages to knowing the physical location of a party one is dealing with across electronically switched networks. For example, in the realm of advertising, knowing the geographic distribution of sales or inquires can be used to measure the effectiveness of advertising across geographic regions. As another example, logon IDs and passwords can only go so far in providing security when a remote user is logging into a system. If stolen, they can be easily used to masquerade as valid users. But if an ability to check the location were part of the security procedure, and the host machine knew the physical location of the remote user, a stolen logon/password could be noted or disabled if not used from or near the appropriate location. Network operators could benefit from knowing the location of a network logon to ensure that an account is being accessed from a valid location and logons from unexpected locations could be brought to the network operator's attention.

Methods of locating electronic emitters to a point on the earth, or geolocating emitters, have been used for many years. These methods include a range of techniques from high-frequency direction finding triangulation techniques for finding a ship in distress to quickly locating the origin of an emergency "911" call on a point-to-point wireline telephone system. These techniques can be entirely passive and cooperative, such as when geolocating oneself using the Global Positioning System or active and uncooperative, such as a military targeting radar tracking its target.

These geolocation techniques may be targeted against a stationary or moving target but most of these direction finding and geolocation techniques start with the assumption they are working with signals in a linear medium. For example, in radio triangulation, several stations each determine the direction from which a common signal was intercepted. Because the assumption can be made that the intercepted signal traveled in a straight line, or at least on a known line of propagation, from the transmitter to each station, lines of bearing can be drawn from each station in the direction from which the signal was intercepted. The point where they cross is the point at which the signal source is assumed to be located.

In addition to the direction of the signal, other linear characteristics can be used to geolocate signals, including propagation time and Doppler shift, but the underlining tenets that support these geolocation methodologies are not applicable to a network environment. Network elements are not connected via the shortest physical path between them, data transiting the network is normally queued and later forwarded depending on network loading causing the data to effectively propagate at a non-constant speed, and switching elements within the network can cause the data to propagate through non-constant routing. Thus, traditional time-distance geolocation methodologies are not effective in a network environment.

In his book "The Cuckoo's Egg" (Doubleday 1989, Ch. 17), Clifford Stoll recounted his difficulties in using simple echo timing on a network to determine the distance from his computer to his nemesis, a computer hacker attacking a University of California at Berkeley computer. Network switching and queuing delays produced echo distance results several orders of magnitude greater than the actual distance between the computers.

In a fully meshed network, every station, from which a geolocation in initiated, is directly connected to every endpoint from which an "echo timing" is measured. The accuracy results of geolocation using round-trip echo timing are dependent on: the degree to which the network is interconnected or "meshed," the specific web of connectivity between the stations and endpoints, the number and deployment of stations, and the number and deployment of endpoints chosen.

Fortunately many of the survivability concerns for which the original ARPAnet was designed, and the commercial forces which gave rise to the expansion of the follow-on Internet and continue to fuel its growth, are also forces and concerns which drive it not only to be more interconnected and meshed but are also working to minimize the effects of latency due to line speed, queue size, and switching speeds. As a result there is a reasonable expectation that forces will continue to work toward the development of a highly meshed Internet.

There are other methods for physically locating a logical network address on the Internet that do not rely on the physics of electronic propagation. One method currently in use for determining the location of a network address relies on network databases. This method of network geolocation looks up the IP address of the host computer to be located, retrieves the physical address of a point of contact for that logical network address from the appropriate registry and then cross-references that physical address to a latitude and longitude. An example of an implementation of such a method can be found at the University of Illinois web site: http://cello.cs.uiuc.edu/cgi-bin/slamm/ip2ll. This implementation uses the Internic registry and the listed technical point of contact to report the physical location of the logical address.

There are a number of shortcomings to this method. First, the level of resolution to which the address is resolved is dependent on the level of resolution of the information in the registry. Second, there is an assumption that the supplied data in the registry correctly and properly identifies the physical location of the logical network address. It is entirely possible the host associated with the logical address is at a completely different physical location than the physical address given for the technical point of contact in the registry. Third, if the supplied physical address given cannot be cross-referenced to a physical location no geolocation is possible. Geolocation information is often available from network databases but access to and the veracity of this information is uncertain. An independent method is needed to geolocate network addresses.

SUMMARY OF THE INVENTION

In consideration of the problems detailed above and the discrepancies enumerated in the partial solutions thereto, an object of the present invention is to provide a method for determining the physical location of network hardware using a logical network address on a non-linear electronically switched network.

Another object of the present invention is to provide a method for determining the physical location of network hardware using a logical network address on a nonlinear electronically switched network evolving in real-time.

Another object of the present invention is to provide a method for determining the physical location of network hardware using a logical network address on a non-linear electronically switched dynamic network independent of databases of network geolocation information.

Another object of the present invention is to provide a method for determining the physical location of network hardware using a logical network address on a non-linear electronically switched dynamic network without reliance on time-distance correlations.

In order to attain the objectives described above, according to an aspect of the present invention, there is provided a method for geolocating logical network addresses.

This invention describes a methodology for geolocation in a non-linear electronically switched dynamic network environment. The instant invention uses the latency of communications to and from an address to be located (ATBL) to determine its location. In order to do this a network latency topology map must first be created. The network latency topology is mapped by measuring the round-trip latency between one or more network stations of known location and many network endpoints, which can themselves be network stations, of known location. Endpoints are chosen to be points dispersed across the network within the area where geolocations will be performed. Potential geolocation resolution is enhanced with an increasing density of endpoints.

The next step is to measure network latency between each station and each endpoint. Latency is the time between when the station sends a message to an endpoint and when an automatic immediate response is received at that station from the endpoint addressed. Multiple latency measurement between each station-endpoint pair are made. The smallest latency value from these multiple measurements between a station-endpoint pair is the empirically determined $T_{min}$ for that station-endpoint pair.

Multiple stations determine their respective Tmin values to each endpoint, these are known as $T_{mins}$. The set of $T_{mins}$ for each endpoint as measured from each station define an endpoint vector specifying the location of that endpoint in latency space relative to the stations. Additionally, a set of $T_{mins}$ is measured between each station and the ATBL, defining an ATBL vector specifying the location of the ATBL in latency space relative to the stations. Next, the distances between the ATBL vector and each endpoint vector are calculated. The smallest of these distances is identified. The ATBL is determined to be most nearly co-located with the endpoint associated with this smallest distance measurement.

BRIEF DESCRIPTION OF THE DRAWINGS

This invention may best be understood when reading the following specification with reference to the accompanying drawings, which are incorporated in and form a part of the specification, illustrate several embodiments of the present invention, and together with the description, serve to explain the principles of the invention. In the drawings:

FIG. 3 is an example of a latency topology map.

DETAILED DESCRIPTION OF THE PREFERRED EMBODIMENTS

Figure 1:
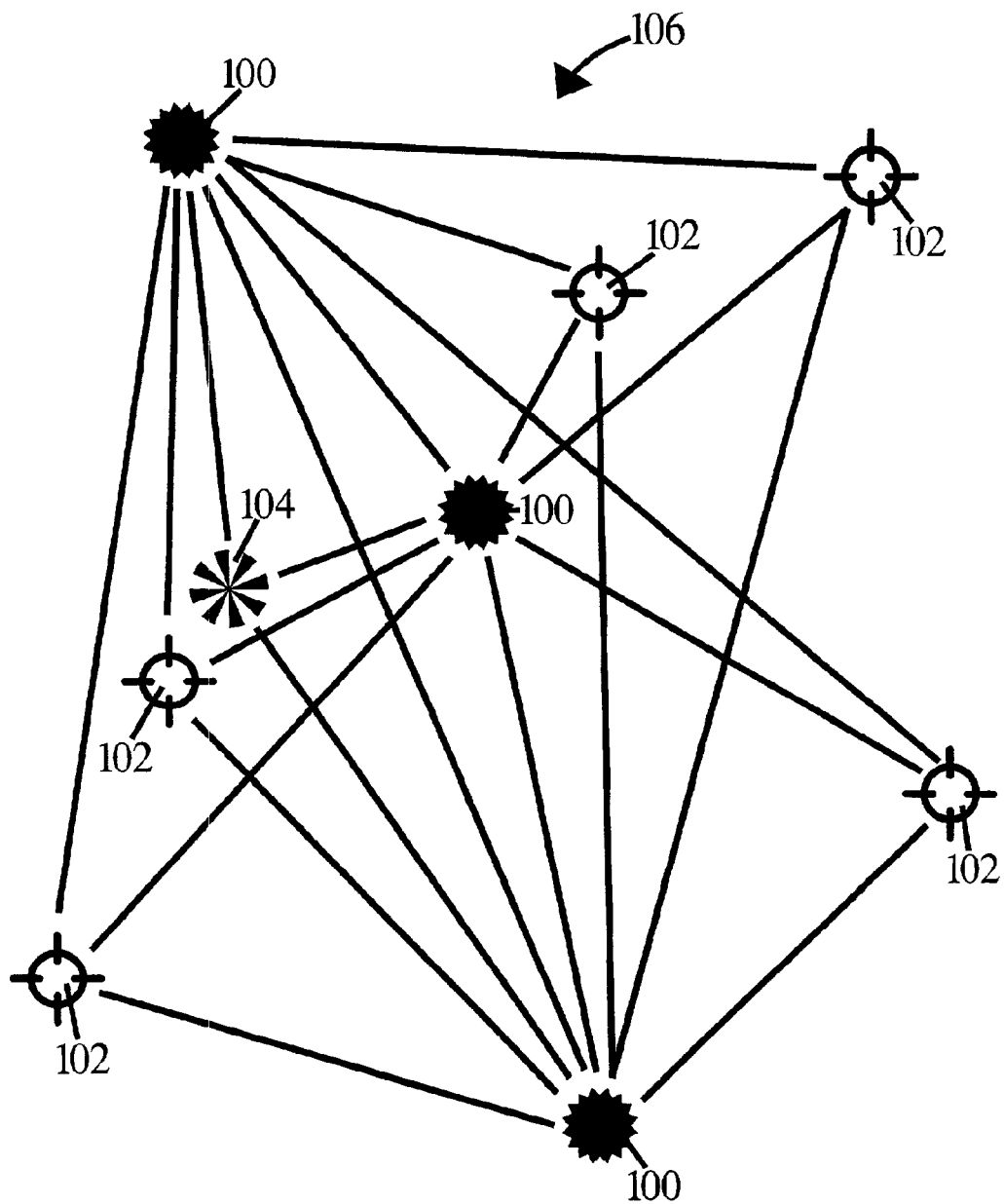
FIG. 1 is a stylized depiction of a non-linear electronically switched dynamic network showing multiple endpoints and stations, as well as, an address to be located.
Figure 2:
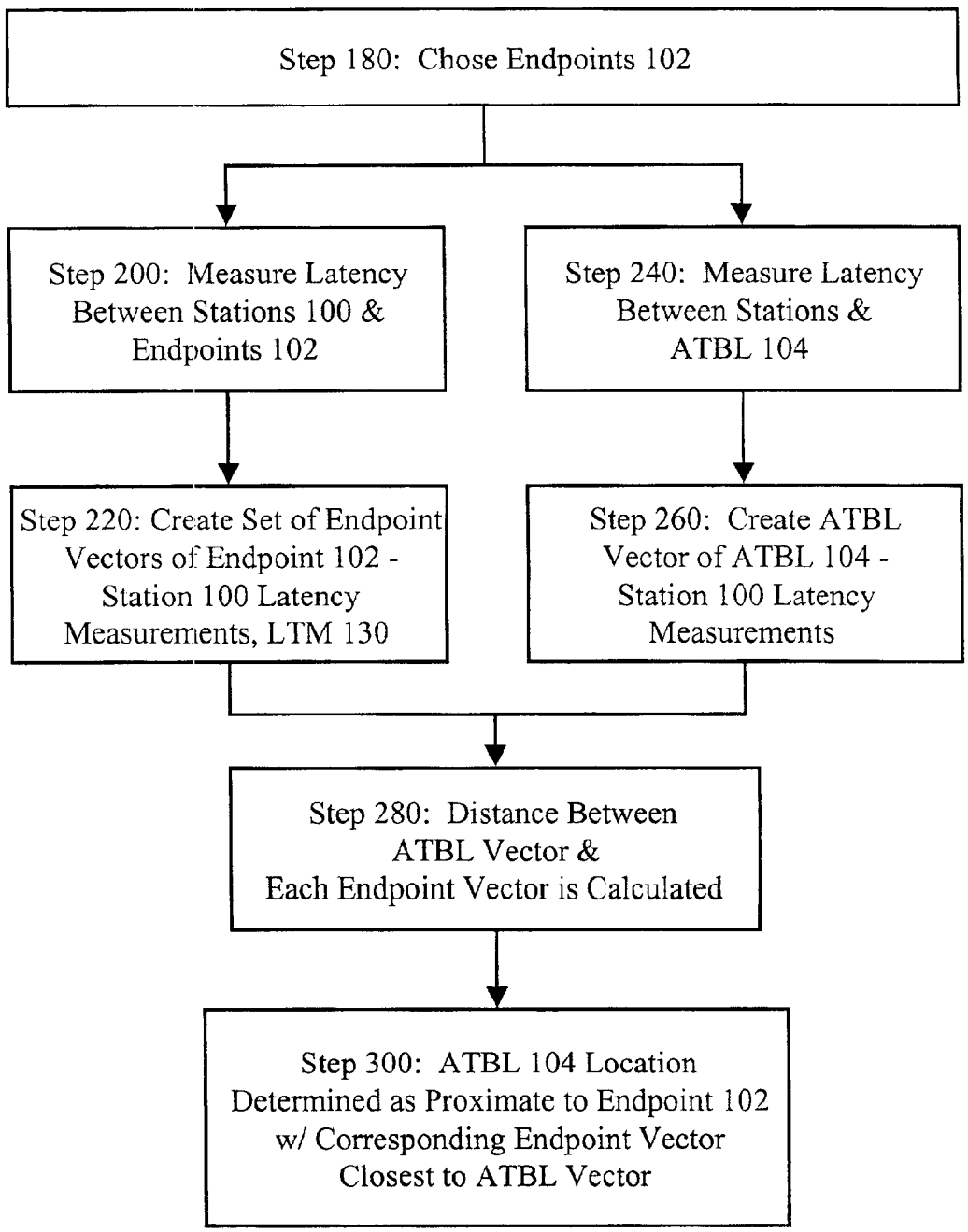
FIG. 2 is a flow chart detailing the steps of the present method.

In order to geolocate an address to be located (ATBL) 104 on a non-linear electronically switched network 106 as depicted in FIG. 1 the signaling propagation characteristics of the network 106 must be measured. Signaling propagation across a network is measured as a latency. In the instant methodology this latency will be measured as the time it takes for a message to go from a station 100 to some specific addressed equipment, producing an immediate automated response, and back to the originating station 100. That specific addressed equipment can be either an endpoint 102, an ATBL 104, or another station 100. The aggregate of this round-trip latency characteristic for many stations 100, each measuring latency to many endpoints 102, is a latency topology map 130 (See FIG. 3) which characterizes the network latency among network stations 100 and endpoints 102.

Data moves through a network 106 at different rates depending on the amount of traffic being handled, the physical characteristic of the network 106, the size of data packets, routing software characteristics, queue size, hardware switching speed, network line speeds and bandwidths, and the physical length to be transited. In network operations there are times the network 106 is slow and there are times when the network 106 is fast. Normally the slow periods occur when the system is heavily loaded with much traffic and the fast periods occur when the system is lightly loaded. These impressions result from the cumulative effect of what happens to many individual packets as they traverse the network 106. Individual packets generally do not all take the same amount of time even when traversing the same path. For some network issues it can be useful to think in terms of an average time, $T_{avg}$, for a packet to travel from one point to another. In general, the amalgamation of transmission times for all packets produces a recognizable distribution. When the network 106 is lightly loaded such a distribution shows many packets with times not too much greater than the minimum round-trip latency time, $T_{min}$. When the network 106 is very busy, the distribution is skewed towards times greater than $T_{min}$.

A crude estimate of the distance through the network 106 between a station 100 and endpoint 102 could be calculated based on the round-trip latency of a data packet. This estimate would be very crude because of the many factors effecting network data rates identified above. Regardless of these many factors, there is an absolute network minimum round-trip latency time, $T_{minabs}$, between any two points on a network. Geolocations could be determined much more accurately if $T_{minabs}$ could be precisely determined. $T_{minabs}$ could theoretically be measured if a packet of minimum length could be transmitted from a network station 100 to an endpoint 102 and back again on a network which had no other data transiting at the time, had no data queues, and was operating optimally—a situation not ready achievable on any significant real-world network.

However if one knows a network's latency characteristics, $T_{min}$ can be determined with some probability to be within some limit of $T_{minabs}$. A statistically significant number of latency measurements can be made. The probability density function of that sample can then be used to determine whether one has obtained a $T_{min}$ within some limit of $T_{minabs}$.

For example, given a desired limit of 2 ms, the empirical probability, P, of obtaining a latency value that is within 2 ms of $T_{min}$ for a known latency probability density function (flat for this example) can be determined. In this very simple example the probability of a sample not being within the defined range limit of $T_{min}$, zero to 2 ms, is $(1-P)$.

The probability that n independent measurements are not within that range is $(1-P)^n$.

So, the probability that at least one of n measurements is within that range is $1-((1-P)^n)$.

Thus once some probability is specified; it is then possible to determine n. If 95% were specified as that probability, then the number of measurements required to obtain a 95% probability of being within 2 ms of $T_{min}$ would be $n=(\log(1-0.95))/(\log(1-P))$, where the value for a fractional answer to n is rounded up to the next integer.

The decision in this example to use 2 ms as the limit is not completely arbitrary. 2 ms was chosen since standard UNIX commands "PING" and "TRACEROUTE" report time in 1 ms increments. Obviously the confidence and limits required will be determined by the accuracy and timeliness required for any geolocation.

Network round-trip latency may be measured for any data packet using a variety of methods, the UNIX commands "PING" and "TRACEROUTE" being two of the most common. For simplicity "ping" will be used hereinafter to designate the determination of network round-trip latency for a data packet. The choice of this single latency measurement method is not intended to limit the instant invention to any latency measurement methods.

The first step 180 in this geolocation method is to choose network stations 100 and endpoints 102 of known physical locations. The choice of stations 100 in most practical applications is already determined; they will be the geolocator's own indigenous network connections from which ping operations may be initiated. The physical locations of stations 100 will therefore typically be known to a high degree of accuracy although this information is not required in the instant geolocation method.

Endpoints 102 are chosen to be geographically dispersed across the area in which the ATBL 104 is expected to be located. A global distribution would, of course, provide global coverage. Endpoints 102 may be the geolocator's own indigenous equipments or any network equipment, of known physical location, capable of responding to a ping. Stations 100 may also be used as endpoints 102 as long as their physical location is known.

In addition to the probability desired and the limit chosen, as explained above, geolocation accuracy will depend on the density and physical distribution of the endpoints 102 chosen, as well as to a lesser extent the number and physical distribution of the stations 100. In some instances the physical distribution of the endpoints 102 chosen will not allow the desired geolocation accuracy. In such instances another set of endpoints 102 may need to be chosen to achieve the desired geolocation accuracy.

Endpoints 102 may be iteratively chosen, based on prior geolocation estimates, to achieve whatever geolocation accuracy is required. Based on an initial geolocation, another set of endpoints 102 physically distributed within the general geographic region of the initial geolocation, may be chosen to allow the initial geolocation to be refined. This process may be repeated to achieve ever more accurate geolocations to the limits of network topology and endpoint 102 availability.

In a special location verification case, there may be only one endpoint 102. As stated above, geolocation accuracy depends on the distribution of endpoints 102 chosen. When only one endpoint 102 is chosen accurate geolocation is not possible. However if this one chosen endpoint 102 were network equipment being used to access the network 106 and the validity and identity of that access from that network equipment location could be independently verified then future access requests using the same identity could be vetted to determine if they were originating at the same network equipment through comparison of the single endpoint 102 multiple station 100 latencies as further described below. In this special location verification case neither the geolocation of the verified access or any future access need be known—it need only be verified that the two locations are the same or within some predefined network latency proximity. Thus a stolen logon identification could not be used except from the same, typically protected, physical location as the valid user. Of course, a valid user might have several "authorized" logon locations.

Multiple latency measurements are made (step 200) between a station 100 and an endpoint 102 over a specified calibration period. Nominally, $T_{min}$ is measured between each station 100 endpoint 102 pair to the limit and probability desired. Network operations or equipment failures may sometimes prohibit determination of a particular station 100 endpoint 102 $T_{min}$ measurement. $T_{min}$ between each station 100 endpoint 102 pair is measured by pinging over a calibration period. In most instances this calibration period is never ending. An alternative methodology is to measure the latency endpoints 102 and ATBL 104 simultaneously over a very short period of time, the shortest period of time being the minimum time required to capture the minimum number of samples for the accuracy desired. The station 100 endpoint 102 pair $T_{mins}$ are continually refined and are updated as network topology changes. Because network topology evolves due to changes in connectivity, routing, and equipment, $T_{min}$ must be based on contemporary information.

A latency topology map 130 (LTM) is generated (step 220) where the LTM 130 is an M by N matrix, of N station-endpoint M-dimensional $T_{min}$ vectors, where M is the number of stations 100 and N is the number of endpoints 102 and the entries are the station 100 endpoint 102 pair $T_{mins}$. If the relationship between network latency and any external factors are well known and repeatable, multiple latency topology maps 130 may be generated for use as the network is affected by such external factors. For example, different latency topology maps 130 of whatever granularity desired may be used for different days of the week, such as business versus non-business days, or times of the day, such as peak daytime hours versus early morning hours.

$T_{min}$ is measured between the ATBL 104 and each station 100 to the limit and probability desired within any time or resource constraints, step 240. A station-ATBL M-dimensional $T_{min}$ vector is then generated consisting of $T_{min}$ from each station 100 to the ATBL 104 in the same order as that used in the LTM 130, step 260.

Next the vector distance between the station-ATBL M-dimensional $T_{min}$ vector and each of the N station-endpoint M-dimensional $T_{min}$ vectors is calculated, step 280: Thus, the ATBL 104 is determined to be physically closest to the endpoint 102 whose corresponding station-endpoint M-dimensional $T_{min}$ vector is closest in vector space to the station-ATBL M-dimensional $T_{min}$ vector, step 300.

Vector distances can be computed using a variety of methods, to include but not limited to, such methods as the Euclidean and Mahalanobis.

Although various methods of the present invention have been described herein in detail to provide for complete and clear disclosure, it will be appreciated by those skilled in the art that variations may be made thereto without departing form the spirit of the invention or the scope of the appended claims.

What is claimed is:

1. A method for geolocating network equipment associated with a logical network address on a communications network, comprising the steps of:

measuring a network latency from a plurality of network stations to a plurality of network endpoints of known physical location by pinging said network endpoints from said network stations multiple times over a calibration period, determining round-trip propagation times between each of said network stations and each of said network endpoints over the calibration period from said pinging, and setting the network latency for each combination of said network stations and said network endpoints to the corresponding minimum round-trip propagation time determined for each of said combination of said network stations and said network endpoints;

measuring the network latency from each of said network stations to said network equipment by pinging said network equipment from said network stations, determining the minimum round-trip propagation time between each of said network stations and said network equipment, and setting the network latency between each of said network stations and said network equipment to the corresponding minimum round-trip propagation time determined;

for each of said network endpoints arranging the network latency from the network endpoint to each of said network stations in turn, in a particular order, as vector elements in an endpoint vector;

arranging the network latency from said network equipment to each of said network stations in turn, in said particular order, as vector elements in a network equipment vector;

determining a distance between the network equipment vector and each of the endpoint vectors; and identifying the physical location of the network equipment as proximate to said known physical location of the network endpoint corresponding to the endpoint vector having said distance to the network equipment vector not greater than the distance from any other of the endpoint vectors to the target equipment vector.

2. A method for verifying that the geolocation of network equipment associated with a logical network address on a communications network is consistent with network equipments associated with vetted geolocations, comprising the steps of:

measuring a network latency from a plurality of network stations to at least one piece of network equipment associated with vetted geolocations by pinging each of said network equipments associated with vetted geolocations from said network stations multiple times over a calibration period, determining round-trip propagation times between each of said network stations and each of said network equipments associated with vetted geolocations over the calibration period from said pinging, and setting the network latency for each combination of said network stations and said network equipments associated with vetted geolocations to the corresponding minimum round-trip propagation time determined for each of said combination of said network stations and said network equipments associated with vetted geolocations;

measuring the network latency from each of said network stations to said network equipment by pinging said network equipment from said network stations, determining the minimum round-trip propagation time between each of said network stations and said network equipment, and setting the network latency between each of said network stations and said network equipment to the corresponding minimum round-trip propagation time determined;

for each of said network equipments associated with vetted geolocations arranging the network latency from each of said network equipments associated with vetted geolocations to each of said network stations in turn, in a particular order, as vector elements in a vetted equipment vector;

arranging the network latency from said network equipment to each of said network stations in turn, in said particular order, as vector elements in a network equipment vector;

determining a distance between the network equipment vector and each of the vetted equipment vectors; and determining if the physical location of the network equipment is proximate to one of said network equipments associated with vetted geolocations.

3. A method for geolocating network equipment associated with a logical network address on a communications network as recited in claim 1, further comprising the additional step of determining if said distance to the network equipment vector not greater than the distance from any other of the endpoint vectors to the target equipment vector is within a user defined threshold.

4. A method for geolocating network equipment associated with a logical network address on a communications network as recited in claim 3, wherein said steps of:

measuring a network latency from a plurality of network stations to a plurality of network endpoints of known physical location;

measuring the network latency for each of said network stations to said network equipment;

for each of said network endpoints arranging the network latency from the network endpoint to each of said network stations in turn, in a particular order, as vector elements in an endpoint vector;

arranging the network latency from said network equipment to each of said network stations in turn, in said particular order, as vector elements in a network equipment vector; and determining a distance between the network equipment vector and each of the endpoint vectors;

are repeated in iteration using additional of said network endpoints until said distance to the network equipment vector not greater than the distance from any other of the endpoint vectors to the target equipment vector is within said user defined threshold.

5. A method for geolocating network equipment associated with a logical network address on a communications network as recited in claim 3, wherein said steps of:

measuring a network latency from a plurality of network stations to a plurality of network endpoints of known physical location;

measuring the network latency for each of said network stations to said network equipment;

for each of said network endpoints arranging the network latency from the network endpoint to each of said network stations in turn, in a particular order, as vector elements in an endpoint vector;

arranging the network latency from said network equipment to each of said network stations in turn, in said particular order, as vector elements in a network equipment vector; and determining a distance between the network equipment vector and each of the endpoint vectors;

are repeated in iteration using a different set of said network endpoints until said distance to the network equipment vector not greater than the distance from any other of the endpoint vectors to the target equipment vector is within said user defined threshold.

6. A method for geolocating network equipment associated with a logical network address on a communications network as recited in claim 3, wherein said steps of:

measuring a network latency from a plurality of network stations to a plurality of network endpoints of known physical location;

for each of said network endpoints arranging the network latency from the network endpoint to each of said network stations in turn, in a particular order, as vector elements in an endpoint vector;

arranging the network latency from said network equipment to each of said network stations in turn, in said particular order, as vector elements in a network equipment vector; and determining a distance between the network equipment vector and each of the endpoint vectors;

are repeated in iteration until said distance to the network equipment vector not greater than the distance from any other of the endpoint vectors to the target equipment vector is within said user defined threshold.

7. A method for geolocating network equipment associated with a logical network address on a communications network as recited in claim 3, wherein said steps of:

measuring the network latency for each of said network stations to said network equipment;

arranging the network latency from said network equipment to each of said network stations in turn, in said particular order, as vector elements in a network equipment vector; and determining a distance between the network equipment vector and each of the endpoint vectors;

are repeated in iteration until said distance to the network equipment vector not greater than the distance from any other of the endpoint vectors to the target equipment vector is within said user defined threshold.

8. A method for geolocating network equipment associated with a logical network address on a communications network as recited in claim 1, wherein said calibration period extends to all previous measuring of said network latency.

9. A method for geolocating network equipment associated with a logical network address on a communications network as recited in claim 1, wherein said calibration period extends back only a user determined amount of time.

10. A method for geolocating network equipment associated with a logical network address on a communications network as recited in claim 1, wherein said communications network is the Internet.

11. A method for geolocating network equipment associated with a logical network address on a communications network as recited in claim 1, wherein said steps of:

measuring a network latency from a plurality of network stations to a plurality of network endpoints of known physical location; and for each of said network endpoints arranging the network latency from the network endpoint to each of said network stations in turn, in a particular order, as vector elements in an endpoint vector;

are performed based on particular sets of user defined external factors and also further comprising the additional step of saving said arranged endpoint vector.

* * * * *